United States Patent Office 2,788,356
Patented Apr. 9, 1957

2,788,356

1,1,2,2-TETRACYANOETHANE AND PREPARATION THEREOF

Richard E. Heckert, Chesterfield County, Va., assignor to E. I. du Pont de Nemours and Company, Wilmington, Del., a corporation of Delaware No Drawing. Application March 23, 1955, Serial No. 496,329

10 Claims. (Cl. 260—429.9)

This invention relates to 1,1,2,2-tetracyanoethane and its salts, and to the production of these novel compounds. The present application is a continuation-in-part of my application Serial No. 421,977, filed April 8, 1954, and allowed to become abandoned on April 15, 1955.

Malononitrile is the lowest member of a theoretical series represented by the general formula

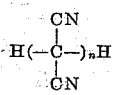

where $n$ is a whole number. However, compounds of this series other than malononitrile, where $n=1$, have been unknown previously. Nitriles are prepared from carboxylic acids by converting the acid to the amide with ammonia and dehydrating the amide. Mowry, Chem. Revs., vol. 42, pages 189 and 258 (1948), discloses that for aliphatic acids in the presence of ammonia, amide formation occurs above 100° C. and nitrile formation occurs in the 200°–350° C. range. However, when carboxyl groups are on adjacent carbons, cyclic imides are formed instead of a plurality of nitrile groups. Thus, when succinic acid is used as the starting material, the succinamide intermediate loses ammonia rather than water and is converted to succinimide. Cyclic imides are also obtained when starting with maleic acid or with mellitic acid, and no exceptions to the general proposition are known.

It is an object of this invention to provide a process for preparing tetracyanoethane. A further object is to provide a novel class of compounds consisting of tetracyanoethane and its salts. Other objects will become apparent from the specification and claims.

In accordance with this invention it has been found that 1,1,2,2-tetracyanoethane can be prepared by a mild reduction of tetracyanoethylene. Mild conditions are employed to avoid attacking the cyano groups. Temperatures employed should not exceed 150° C., in order to be well below the decomposition temperature of tetracyanoethane, and preferably should be less than 50° C. Solution in an inert solvent facilitates control of the temperature. Reduction of tetracyanoethylene in solution may be accomplished with hydrogen in the presence of a hydrogenation catalyst. Reduction with a solution of hydriodic acid or, in nonbasic media, of an aliphatic thiol having an oxygen atom located on a carbon alpha to the thiol-substituted carbon is preferred because of the ease with which the extent of reduction is controlled.

The tetracyanoethylene starting material may be prepared by reacting sulfur monochloride with malononitrile, preferably in the presence of an inert liquid diluent to control the exothermic reaction. Suitable diluents include chloroform, carbon tetrachloride, tetrachloroethylene, benzene, toluene and xylene. Water should be excluded. Temperatures as low as 25° C. may be used, but it is advantageous to operate in the range of 50° to 125° C. Substantially equivalent proportions of sulfur monochloride and malononitrile should be used for best results.

Tetracyanoethylene can be isolated from the reaction mixture, after evaporation of the diluent, if any, by extraction with a selective solvent, such as diethyl ether, or by sublimation under reduced pressure.

1,1,2,2-tetracyanoethane crystallizes biaxially, with one of the refractive indices having a value of 1.538. It is a strong acid, the logarithm of the reciprocal of the dissociation constant in water, pKa, being 3.6. It melts at 170°–175° C. (under pressure) and sublimes at 130°–150° C. It is much more stable than other tetracyanoalkanes, apparently because each carbon atom in the tetracyanoethane structure carries two cyano groups. Thus 1,1,3,3-tetracyanopropane, for example, decomposes to give 1,1-dicyanoethylene when heated above 137° C., and does not exist in gaseous form. Tetracyanopropane is only mildly acidic, having a pKa of 6.2. Tetracyanoethane also differs from it in being a reducing agent.

Tetracyanoethane dissolves readily in aqueous potassium or sodium bicarbonate to form a solution of the corresponding alkali salt; it titrates as a monobasic acid under these conditions. An aqueous solution of tetracyanoethane reacts upon addition to aqueous suspensions of copper, cobaltous and zinc carbonate to form corresponding water soluble copper, cobaltous and zinc salts of tetracyanoethane. Other salts may be formed similarly with any cation of a water-soluble base, including inorganic cations, trialkylsulfonium cations and amines. The salts are particularly desirable forms of this compound because of their greater stability, which permits storage for extended periods of time without appreciable oxidative degradation. Tetracyanoethane may be recovered from its salts by treatment with stronger acids, by treatment with an ion exchange resin, or by electrolysis.

The following examples illustrate preferred embodiments of the invention:

Example I

Tetracyanoethylene, in amount of 12.8 g. (0.1 mole), is dissolved in 50 ml. of acetone, the solution is cooled in an ice bath, and 50 ml. of concentrated hydriodic acid are added slowly with stirring. White crystals precipitate almost immediately. The reaction mixture is cooled, and the precipitate is collected on a filter, washed with water to remove the iodine, and recrystallized from hexane/ethyl acetate mixture to yield 12 g. (92%) of white crystalline 1,1,2,2-tetracyanoethane. Analysis of this product follows:

Found: C, 55.15, 55.68; H, 1.44, 1.62; N, 43.23, 42.98; mol. wt., 128, 120. Calc'd (for $C_6H_2N_4$): C, 55.38; H, 1.55; N, 43.07; mol. wt., 130.

Example II

An amount of 7.8 g. (0.1 mole) of beta-mercaptoethanol is added in two equal portions to a solution of 6.4 g. (0.05 mole) of tetracyanoethylene in 25 ml. of acetone. The solution is evaporated to dryness, and the residue is collected on a filter, washed with ether, and recrystallized from water to give 4.6 g. (71%) of tetracyanoethane, melting (with decomposition) at 170°–175° C. The X-ray diffraction pattern of this product is identical with that of tetracyanoethane prepared as in the preceding and following examples.

Example III

A solution of 19.2 g. (0.15 mole) of tetracyanoethylene in 75 ml. of acetone is cooled in an ice bath and stirred during addition of 30 ml. of mercaptoacetic acid. The solution is cooled to 0° C., and 150 ml. of water are added. White needles separate; they are collected on a filter, washed with water, and recrystallized from acetone/water to give 16.5 g. (83% yield) of tetracyanoethane, M. P. 170°–175° C. (d.).

Calc'd (for $C_6H_2N_4$): C, 55.38; H, 1.55; N, 43.07. Found by analysis: C, 55.68, 55.91; H, 1.87, 1.75; N, 42.98, 42.69.

*Example IV*

Tetracyanoethylene (5 g.) in tetrahydrofuran solution is exposed to hydrogen under a pressure of three atmospheres at room temperature in the presence of 0.5 g. of palladium black. After several minutes, the catalyst is removed by filtration, and the solution is evaporated to dryness. Treatment of the residual solid with diethyl ether yields a brown solid (3 g., 59%) and a red ether solution. Tetracyanoethane is obtained as a white crystalline solid upon sublimation of the brown solid at 130°–150° C. under 5 mm. pressure.

Calc'd (for $C_6H_2N_4$): C, 55.38; H, 1.55; N, 43.07; mol. wt., 130. Found by analysis: C, 54.87, 54.89; H, 1.85, 1.68; N, 43.24, 43.27; mol. wt., 145, 139.

Tetracyanoethane and its salts are useful as fungicides and insecticides. For example, small amounts of tetracyanoethane have proved fatal to cockroaches. Tetracyanoethane has developing action for photographic emulsions, and its salts are useful in electroplating.

Since many different embodiments of the invention may be made without departing from the spirit and scope thereof, it is to be understood that the invention is not limited by the specific illustrations except to the extent defined in the following claims.

What is claimed is:

1. A compound selected from the class consisting of 1,1,2,2-tetracyanoethane and salts thereof with water-soluble cations.

2. 1,1,2,2-tetracyanoethane.

3. A salt of 1,1,2,2-tetracyanoethane and water-soluble cation.

4. A metal salt of 1,1,2,2-tetracyanoethane.

5. The process which comprises preparing 1,1,2,2-tetracyanoethane by reducing tetracyanoethylene under mild conditions.

6. The process for preparing 1,1,2,2-tetracyanoethane which comprises reacting tetracyanoethylene with a reducing agent at a temperature under 50° C.

7. A process as defined in claim 6 in which the tetracyanoethylene is dissolved in an inert solvent.

8. The process for preparing 1,1,2,2-tetracyanoethane which comprises reacting hydrogen with tetracyanoethylene in solution in the presence of a hydrogenation catalyst at a temperature below 50° C.

9. The process for preparing 1,1,2,2-tetracyanoethane which comprises reacting tetracyanoethylene with hydriodic acid in solution in an inert solvent.

10. The process for preparing 1,1,2,2-tetracyanoethane which comprises reacting tetracyanoethylene with an aliphatic thiol, having an oxygen atom located on a carbon alpha to the thiol-substituted carbon, in solution in a nonbasic media.

References Cited in the file of this patent
UNITED STATES PATENTS 2,514,387    Gilbert _____ July 11, 1950

OTHER REFERENCES

Mannich et al.: Ber. Deut. Chem., vol. 55, pp. 3509–10 (1922).

Meier: Ber. Deut. Chem., vol. 86, page 1491 (1953).